United States Patent

[11] 3,597,028

[72] Inventors Viktor Vasilievich Ivanov
Krasnoprudnaya ulitsa, 26, kv. 26;
Vladimir Karpovich Karakhaian,
Stromynka, 23, kv. 131; Viktor
Alexandrovich Senatorov, II Novo-
Ostankinskaya, 27, kv. 61, Moscow;
Vyacheslav Alexandrovich Tarasov, ulitsa
Pavlovskaya, 29, kv. 1, Elektrougli
Maskovskoi oblasti, all of, U.S.S.R.
[21] Appl. No. 849,347
[22] Filed Aug. 12, 1969
[45] Patented Aug. 3, 1971

[54] FLUID CONTACT THRUST BEARING OF DOUBLE ACTION
2 Claims, 1 Drawing Fig.
[52] U.S. Cl.................................................. 308/160
[51] Int. Cl..................................................... F16c 17/06
[50] Field of Search............................................ 308/160, 168, 170, 172

[56] References Cited
UNITED STATES PATENTS
2,570,682 10/1951 Imbert........................ 308/160
Primary Examiner—Martin P. Schwadron
Assistant Examiner—Frank Susko Attorney—Waters, Roditi, Schwartz & Nissen ABSTRACT: A fluid contact thrust bearing structure of double action, adapted for taking up axial loads in a machine, for example, in a centrifugal pump, comprises a journal plate fixedly secured to the rotary shaft of said machine, with bearing members disposed adjacent the face end surfaces of this journal plate and spaced therefrom. These bearing members are supported on a stationary part of said machine, which stationary part also houses passage means for supplying pressurized working fluid into an annular central chamber of the bearing structure. This central chamber communicated through a pair of annular outlet throttling gaps, defined between said bearing members and the respective adjacent face surfaces of said journal plate, with a pair of oppositely disposed lateral working chambers, which, in turn, communicate with a low-pressure chamber through a pair of outlet annular throttling gaps. A characteristic feature of the herein disclosed bearing structure in the fact that if the journal plate is axially displaced in operation, the axial extent of the inlet throttling gap associated with one of the two working chambers is reduced, and the axial extent of the outlet throttling gap associated with said one working chamber is increased, whereas the axial extent of the inlet throttling gap associated with the other one of said two lateral working chambers is increased, and the axial extent of the outlet throttling gap associated with said other working chamber is reduced; the inlet throttling gaps of the working chambers being spaced greater from the longitudinal axis of said journal plate than the outlet throttling gaps.

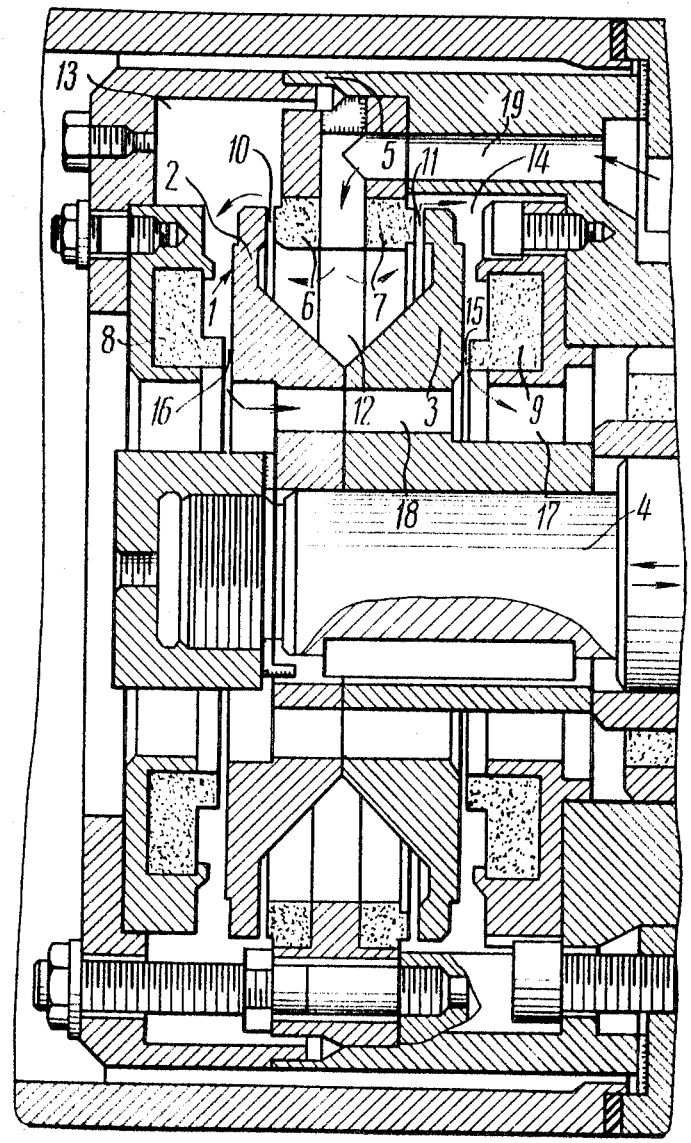

FLUID CONTACT THRUST BEARING OF DOUBLE ACTION

The present invention relates to structural parts of machinery, and, more particularly, it relates to double-action fluid contact thrust bearings, or hydrogasostatic thrust bearings, incorporated in various machines, for example, in centrifugal pumps, for absorbing axial loads developed therein.

In the bearings of the known type there is a journal plate secured on a rotary shaft, with bearing members supported by a stationary part of the machine and disposed adjacent the opposite face ends of these journal plates. There are also provided passages for supplying pressurized working fluid into pressure chambers communicating through radial gaps with a low-pressure chamber.

In this known type of thrust bearings the pressurized working fluid directed into the working pressure chambers is throttled at the entrance of these chambers by radial gaps situated between the respective cylindrical surfaces of the journal plate and the adjacent surfaces of the stationary part of the bearing structure (the hydraulic flow resistance of these gaps being independent of the actual position of the journal plate in the axial direction). At the outlet of the pressure chambers the flow of the pressurized working fluid is throttled by gaps defined between the face end portions of the journal plate and the adjacent surfaces of the stationary part of the bearing structure. It is, therefore, clear that the most essential characteristic feature of such bearing is the proportion between the flow resistance values of the gaps at the entrance of the pressure chambers and at the outlet therefrom. Maximal load-bearing capacity of such bearing is achieved within a comparatively small range of the values of this proportion. However, throughout the operation life of the bearing this proportion constantly changes on account of nonuniform wearing out of the surfaces defining the gaps. As a result, the bearing gradually loses its load-bearing capacity, the rate of flow of the pressurized working fluid through the bearing structure increases, until, finally, the load acting on the bearing becomes excessive for its load-bearing capacity, and the bearing fails.

Moreover, the mere existence in this known type of thrust bearings of gaps having restricted cross-sectional areas, defined between cylindrical surfaces, involves complicated manufacturing and assembling of the bearings.

It is an object of the present invention to overcome these disadvantages. Other objects and advantages of the present invention will become apparent from the following disclosure.

The present invention has for its aim the provision of a fluid contact thrust bearing which will have an increased load-carrying capacity, as compared with the known bearings used for similar purposes, the value of the pressure of the working fluid supplied being the same as in the case of these known bearings, and which will also require less working fluid, have more accurate response to variations in the load applied thereto, and feature greater dependability and longer operational life.

This aim is attained by the provision of a fluid contact thrust bearing of double action, adapted for absorbing axial loads in a machine, for example in a centrifugal pump, comprising a journal plate and a pair of bearing members disposed adjacent the opposite faces of said journal plate, so that a pair of radially extending butt end outlet throttling gaps are defined on the opposite sides of said journal plate between said bearing members and said journal plate; the bearing members being supported by a stationary part of said machine; said stationary part having passages therein through which pressurized working fluid can be supplied into an annular central chamber; said annular central chamber communicating through respective gaps with a pair of opposite lateral working chambers and with a low-pressure chamber. In accordance with the present invention, in the above-described bearing structure there is also a pair of butt end inlet throttling gaps extending radially between said plate and said bearing members, said butt end inlet throttling gaps being disposed further from the longitudinal axis of said journal plate than said butt end outlet throttling gaps, whereby, should the journal plate be displaced axially in one direction, the axial extent in the inlet gap associated with one of said two lateral working chamber is reduced, and the axial extent of the outlet gap associated with said one lateral working chamber is increased; whereas the axial extent of the inlet gap associated with the other one of said two lateral working chambers is increased, and the axial extent of the outlet gap associated with said other lateral working chambers is reduced. Alternately, should the journal plate be displaced axially in the opposite direction, the axial extent of said inlet gap associated with said one lateral working chamber is increased, and the axial extent of said outlet gap associated with said one chamber is reduced, whereas the axial extent of said inlet gap associated with said other lateral working chamber is reduced, and the axial extent of said outlet gap associated with said other lateral working chamber is increased.

It is advisable for the journal plate of a fluid contact thrust bearing, embodying the invention, to be made up by two disc-shaped parts secured together.

The present invention will be better understood from the following detailed description, thereof due reference being had to the accompanying drawing an axial sectional view, taken in a vertical plane, of said bearing embodying the invention.

Referring now to the drawing, the double-action thrust bearing, embodying the invention, comprises a journal plate 1 made up by two disc-shaped parts 2 and 3 which are nonrotatably secured on rotary shaft 4 of a machine. In the herein-described embodiment of the invention this machine is a hermetically sealed centrifugal pump. The stationary part 5 of the pump supports thereon four bearing members 6, 7, 8 and 9. Axial clearances 10 and 11 acting as the inlet throttling gaps are left intermediate the end faces of the bearing members 6 and 7 and the respective adjacent end surfaces of the journal plate 1, said butt end gaps 10 and 11 establishing communication between central annular chamber 12 with two opposite lateral working chambers 13 and 14. Two clearances 15 and 16 acting as the outlet throttling gaps are left between the adjacent end surfaces of the bearing members 8 and 9 and the journal plate 1, the gap 15 establishing communication directly between the working chamber 14 and a low-pressure chamber 17, whereas the gap 16 establishes communication between the working chamber 13 and a low-pressure chamber 17 through apertures 18 provided through the journal plate 1. As it can be seen from the drawing, the outlet gaps 15 and 16 are disposed nearer to the longitudinal axis of the journal plate 1 than the inlet gaps 10 and 11. Passages 19 are provided in the stationary part 5 of the pump, through which the pressurized working liquid is supplied into the central annular chamber 12 of the bearing structure.

The herein-described bearing assembly operates, as follows.

The working liquid is supplied under pressure through the supply passages 19 into the annular central chamber 12, wherefrom it is directed along two paths: the first, through the gap 10, the lateral working chamber 13, the gap 16 and the apertures 18 into the low-pressure chamber 17; and the second, through the gap 11, the lateral working chamber 14 and the gap 15 also into the low-pressure chamber 17. If the journal plate 1 is displaced to the left under the action of some axial forces developed in the course of operation of the pump and acting upon the shaft 4, the axial extent of the inlet throttling gap 11 is reduced, whereas the axial extent of the outlet throttling gap 15 is increased, whereby the pressure inside the chamber 14 drops, with a tendency to become equal to the pressure inside the low-pressure chamber 17. Simultaneously, the axial extent of the inlet throttling gap 10 increases, and the axial extent of the outlet gap 16 is reduced, whereby the pressure inside the chamber 13 increases, with a tendency to become equal to the pressure inside the central chamber 12.

As a result, the pressure differential which is now established between the opposite lateral working chambers 13 and 14, acts upon the respective working surfaces of the journal plate 1 (which in this case acts as a double-sided piston) and thus counterbalances the axial thrust applied to the shaft of the pump.

The response of the herein-described bearing assembly will be similar to that already mentioned, in the case when the axial thrust applied to the shaft displaces the journal plate 1 to the right.

The present invention may be embodied in a number of other modifications thereof, according to which the journal plate 1 and the bearing members 6, 7, 8 and 9 can be of different configuration and arranged differently in relation to each other, as compared with the embodiment described above, so as to correspond to the immediate structural requirements of the actual applications of the invention. However, the advantages offered by the herein-disclosed bearing assembly can be achieved only if the following feature is provided for: reduction of the flow resistance (liquid or gas flow resistance) of the inlet throttling gap and increasing of the flow resistance of the outlet throttling gap in one working chamber should by all means be accompanied by increasing of the flow resistance of the inlet gap and reduction of the flow resistance of the outlet gap in the other working chamber.

Practical tests which have been carried out with a number of hermetically sealed vertical centrifugal pumps incorporating bearing assemblies constructed in accordance with the principles of the present invention have shown that these thrust bearings, as compared with the known kinds of bearings used for the purpose, feature greater load-bearing capacity which is practically unaffected by the wearing away of the above-described bearing members, require a very moderate amount of the working fluid and are highly reliable over a long service life.

A thrust bearing assembly constructed in accordance with the principles of the present invention can be used in machines of various kinds, where axial loads applied to rotary shafts have to be dealt with, however, the advantages of its use are more pronounced in the case of hermetically sealed apparatus and machinery employed by various branches of chemistry and related industries, wherein it is virtually impossible to incorporate common-type antifriction and plain bearings.

Although the present invention has been described in connection with a preferred embodiment thereof, it should be understood that various modifications and changes may take place without departing from the spirit and scope of the invention, as defined in the claims to follow.

What we claim is:

1. A fluid contact thrust bearing of double action adapted for absorbing axial loads in a machine, for example, in a centrifugal pump, comprising: a rotary shaft of said machine; a journal plate fixedly secured on said rotary shaft; a first pair of bearing members disposed adjacent the respective end surfaces of said journal plate, said first pair of bearing members being carried by a stationary portion of said machine, said first pair of bearing members defining together with said journal plate an annular central chamber communicating with a pair of butt end inlet throttling gaps each having a predetermined axial extent; fluid passage means provided in a stationary portion of said machine, said fluid passage means communicating with said central annular chamber and adapted to supply pressurized working fluid into said central chamber; a second pair of bearing members also carried by a stationary portion of said machine and defining together with said journal plate a pair of butt end outlet throttling gaps, each of a predetermined axial extent, and a pair of oppositely disposed lateral working chambers communicating with said annular central chamber through said butt end inlet throttling gaps; a low-pressure chamber communicating with said pair of lateral working chambers through said butt end outlet throttling gaps respectively; said butt end inlet throttling gaps being spaced by a greater radial distance from the longitudinal axis of said journal plate, than said butt end outlet throttling gaps; such that upon displacement of said journal plate axially to one side, the axial extent of said inlet throttling gap associated with one of said lateral working chambers is reduced and the axial extent of said outlet throttling gap associated with said one lateral working chamber is increased, whereas the axial extent of said inlet throttling gap associated with the other one of said lateral working chambers is increased and the axial extent of said outlet throttling gap associated with said other working chamber is reduced; and upon displacement of said journal plate axially to the opposite side, the axial extent of said inlet throttling gap associated with said one lateral working chamber is increased and the axial extent of said outlet throttling gap associated with said one lateral working chamber is reduced, whereas the axial extent of said inlet throttling gap associated with said other lateral working chamber is reduced and the axial extent of said outlet throttling gap associated with said other lateral working chamber is increased.

2. A fluid contact thrust bearing structure, according to claim 1, wherein said journal plate includes two disc-shaped parts.